(12) United States Patent
Weber

(10) Patent No.: US 9,393,656 B1
(45) Date of Patent: Jul. 19, 2016

(54) RISER FOR USE WITH A GRIPPING DEVICE

(71) Applicant: Gene Weber, Fresno, CA (US)

(72) Inventor: Gene Weber, Fresno, CA (US)

(73) Assignee: Dan Wilkins, Redmond, OR (US)

( * ) Notice: Subject to any disclaimer, the term of this patent is extended or adjusted under 35 U.S.C. 154(b) by 0 days.

(21) Appl. No.: 14/632,759

(22) Filed: Feb. 26, 2015

(51) Int. Cl.
 *B23Q 3/10* (2006.01)
 *B23Q 3/06* (2006.01)
 *F16B 43/00* (2006.01)

(52) U.S. Cl.
 CPC .............. *B23Q 3/103* (2013.01); *B23Q 3/069* (2013.01); *F16B 43/00* (2013.01)

(58) Field of Classification Search
 CPC .......... B23B 1/07; B23Q 3/104; B23Q 3/107; B23Q 3/067
 See application file for complete search history.

(56) References Cited

U.S. PATENT DOCUMENTS

| | | | | |
|---|---|---|---|---|
| 2,587,025 A * | 2/1952 | Beck | ........................ | B23Q 3/06 101/386 |
| 4,915,367 A * | 4/1990 | Carossino | ................. | B25B 1/08 269/101 |
| 5,056,766 A * | 10/1991 | Engibarov | ................. | B25B 5/08 269/101 |
| 5,226,637 A * | 7/1993 | Kitaura | ..................... | B25B 5/08 269/234 |
| 5,310,299 A * | 5/1994 | Bernstein | .................. | B25B 5/08 269/229 |
| 5,624,106 A * | 4/1997 | Weber | ....................... | B25B 5/08 269/138 |
| 5,641,257 A * | 6/1997 | Bernstein | .................. | B25B 5/08 269/232 |
| 5,718,420 A * | 2/1998 | Bernstein | .................. | B25B 5/08 269/138 |
| 6,158,728 A * | 12/2000 | Smith | ..................... | B25B 5/006 269/88 |
| 6,394,439 B1 * | 5/2002 | Weber | .................. | B25B 1/2478 269/138 |
| 6,993,821 B2 * | 2/2006 | Ahti | ...................... | B23Q 3/103 269/297 |
| 7,753,350 B2 * | 7/2010 | Barziza | .................. | B23Q 3/102 269/100 |
| 8,011,648 B1 * | 9/2011 | Nelson | ................... | B23Q 3/103 269/138 |
| 8,210,510 B2 * | 7/2012 | Li | ........................... | B25B 1/103 269/246 |
| 8,931,772 B2 * | 1/2015 | Phillips | ..................... | B25B 5/06 269/289 R |

* cited by examiner

*Primary Examiner* — Lee D Wilson
(74) *Attorney, Agent, or Firm* — Merek, Blackmon & Voorhees, LLC

(57) ABSTRACT

Adjusting the height of a gripping device above the surface of a fixture by providing a separate riser between the gripping device and the working surface of a fixture. The risers can be stacked as needed to raise the gripping device to an elevation to effectively grip the workpiece. The guide in the riser blocks for the gripping devices will direct the gripping device in a central predetermined position of the part to be machined or welded, thus saving time on the unclamping and clamping of the parts resulting in a great cost saving of time and labor. Additionally, risers of different sizes can be more easily manufactured than the gripping device itself.

7 Claims, 5 Drawing Sheets

RISER FOR USE WITH A GRIPPING DEVICE

FIELD OF THE INVENTION

The invention relates, in general, to machine tools, and, more particularly, to devices for holding a workpiece on the supporting surfaces of cutting machines, especially for use in repetitive production.

BACKGROUND OF THE INVENTION

Many mechanical operations require that one or more workpieces be held stationary for a period of time. Various types of clamps and other devices are known in the art for securing a workpiece in a desired position to facilitate an operation on the workpiece.

One apparatus for securing one or more workpieces is disclosed in my U.S. Pat. No. 5,624,106. The gripping device disclosed in this patent has a gripper wall which is tapered from the upper portion to the lower portion where the tapered gripper wall provides the holding force. The gripping member includes a through bore having a conical surface where one side is more recessed than the other and the fastener bears against the shallow conical surface thereby creating the downward inward holding force. The gripping device also includes a tapered head and further includes a countersink having first and second conical surfaces the first conical surface being in axial alignment with, the through bore and the second conical surface having an axis offset from that of the through bore whereby the tapered head of the fastener bears against the countersink when the fastener is secured to the fixture thereby creating the downward inward holding force.

In view of the foregoing, it can be understood that each gripping device of my U.S. Pat. No. 5,624,106 requires substantial machining to manufacture and therefore manufacturing gripping devices of different sizes to hold different sizes of workpieces requires machining of each size gripping device. Furthermore, a principle objective is to create an optimum central holding force on round or out of round or odd material objects for machining or even welding pieces together.

SUMMARY OF THE INVENTION

The present invention allows adjusting the height of a gripping device above the surface of a fixture by providing a separate riser between the gripping device and the working surface of a fixture. The risers can be stacked as needed to raise the gripping device to an elevation to effectively grip the workpiece. The guide rails in the riser blocks for the gripping devices will direct the gripping device in a central predetermined position of the part to be machined or welded, thus saving time on the unclamping and clamping of the parts resulting in a great cost saving of time and labor. Additionally, risers of different sizes can be more easily manufactured than the gripping device itself.

Accordingly, it is an object of the present invention to provide a device for holding a workpiece in position while the workpiece is being worked on by a machine.

It is a further object of the invention to have a riser to raise the gripping device above the working surfaced of a fixture so that the gripper wall of the gripping device which is tapered from the upper portion to the lower portion where the tapered gripper wall provides the holding force on the workpiece.

It is yet another object of the invention to provide a riser with a through bore having a conical countersink so that a fastener head retaining the riser is flush or below the supporting surface of the riser.

It is still a further object of the present invention to provide a riser having a second horizontally extending through bore that allows for adjustment.

Yet another object of the invention is to provide a riser having a central recess within a pair of rails designed to retain the gripping device in the central recess between the rails.

Still another object of the invention is to provide a central recess between a pair of lands for retaining the gripping device in the central recess between the pair of lands.

According to the present invention, a riser for a gripping member is provided for raising the gripping wall of the gripping device to facilitate holding a workpiece on a fixture.

The invention will become more fully apparent from the claims and the description in connection with the drawings.

DETAILED DESCRIPTION OF THE PREFERRED EMBODIMENT

Figure 1:
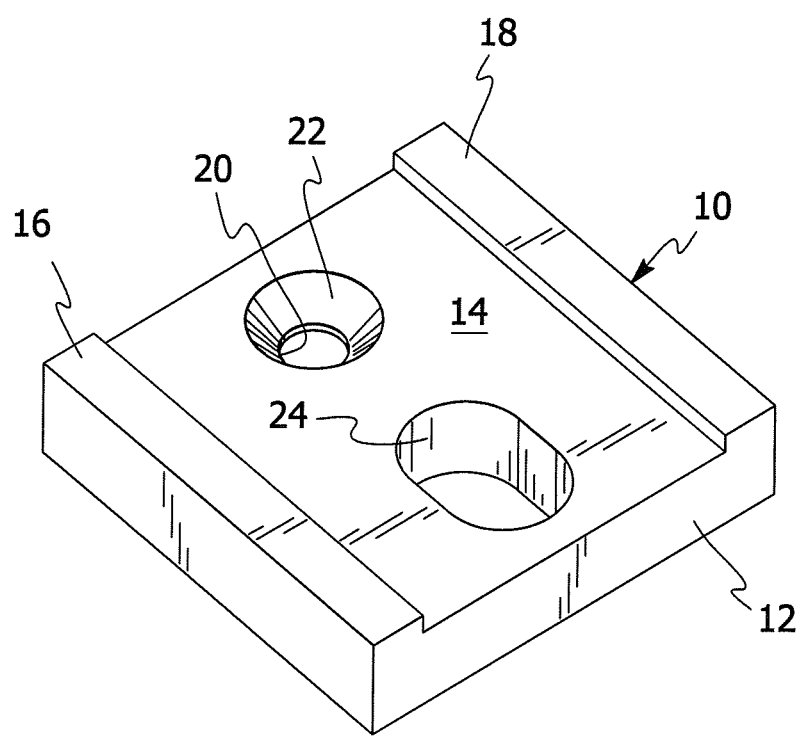
FIG. 1 is a top perspective view a first embodiment of the riser.

Referring to FIG. 1, there is shown a riser 10 preferably formed of rigid material such as metal, generally aluminum, brass or steel. The riser 10 includes a base portion 12, a central section 14 and side rails 16 and 18. The central section 14 preferably includes a first through bore 20 having countersunk conical portion 22. The central section 14 also includes a second through bore 24 which may be elongated.

Figure 2:
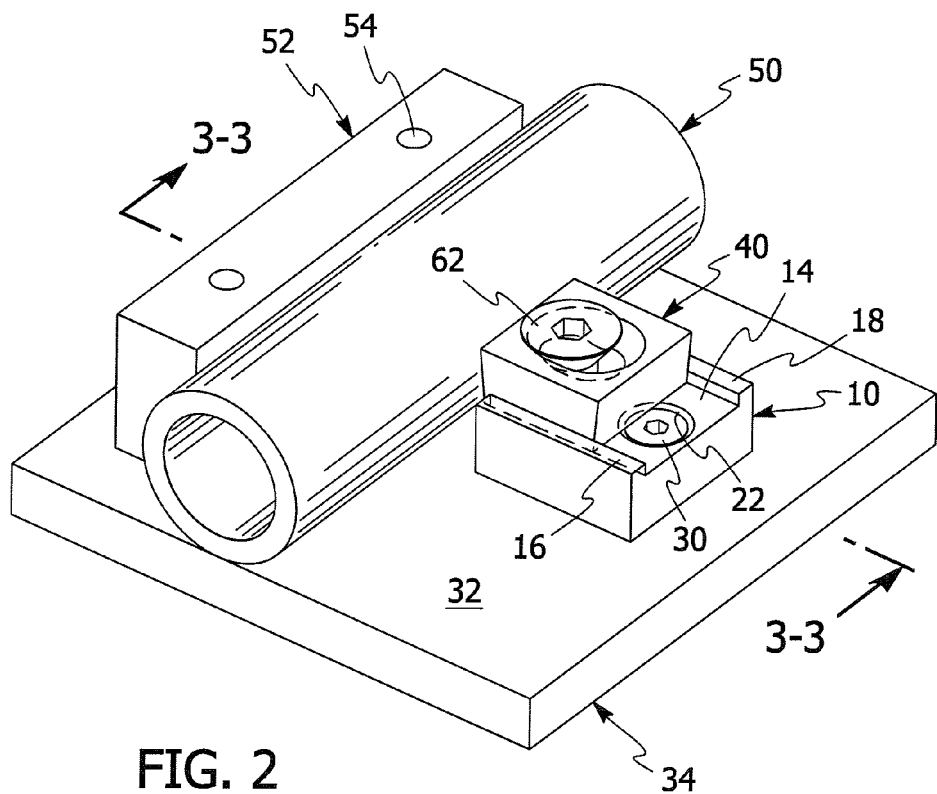
FIG. 2 is a perspective view of a gripping member mounted to the riser of FIG. 1.

As shown in FIG. 2, the first through bore 20 is preferably sized for a 10-24 thread or larger flat head bolt or screw 30. The conical portion 22 allows the head of the screw 30 to set flush with or below the central section 14. The first through bore 20 is a clearance hole and is not threaded. The screw 30 will thread into the support surface 32 of the fixture 34. A gripping device 40 can be mounted on the riser 10 and is preferably sized to set on the central section 14 between the side rails 16 and 18. The gripping device 40 is described in my U.S. Pat. No. 5,624,106 issued on Apr. 29, 1997 and my U.S. Pat. No. 5,961,108 issued on Oct. 5, 1999 and my U.S. Pat. No. 6,394,439 issued on May 28, 2002 all three of which are incorporated herein by reference in their entirety. The gripping device 40 is used in machining operations to clamp a workpiece in place while machining operations are being performed and then the gripping device 40 can be loosened from the workpiece and the finished workpiece can be removed and a new workpiece can be installed and clamped down to repeat the machining operation.

Figure 3:
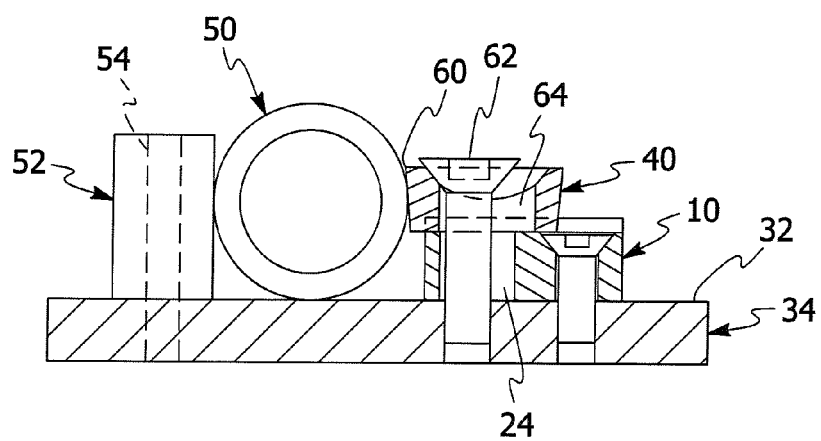
FIG. 3 is a cross-sectional view of FIG. 2 taken along lines 3-3.

FIG. 2 and FIG. 3 show a workpiece 50 held on the support surface 32. It should be understood that the support surface has various threaded screw holes to accommodate various sized workpieces and clamping devices. A stop or block 52 provides a fixed wall to prevent movement of the workpiece 50 in a direction away from the gripping device 40. The block 52 may be a steel block which is pinned to fixture 34 via a pin, screw or rod 54 as shown in FIG. 3.

As shown in the cross-section of FIG. 3 taken along lines 3-3 of FIG. 2, the top edge 60 of the gripping device 40 is above the center of the round workpiece 50 to clamp the workpiece 50 with both a sideways and a downward force to prevent the workpiece 50 from moving during machining operations. The riser 10 elevates the gripping device 40 above the support surface 32. A second threaded screw 62 engages the gripping device 40 and extends through an opening 64 of the gripping device 40 and also through the through bore 24 of riser 10 and into the support surface 32 of fixture 34. The rails 16 and 18 in the riser 10 provide a central predetermined position and angle for replacing the gripping device 40 in the precise location to facilitate gripping the next workpiece to be machined or welded.

Figure 4:
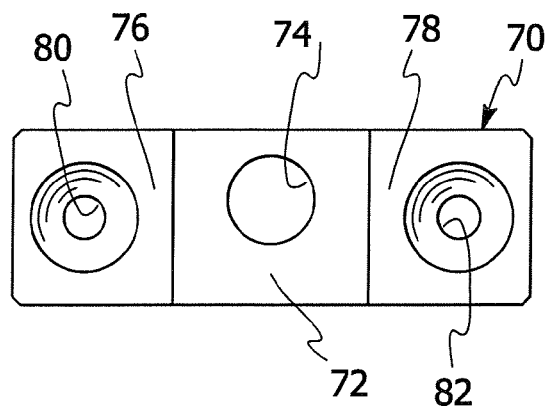
FIG. 4 is a top view of another embodiment of the riser.
Figure 5:
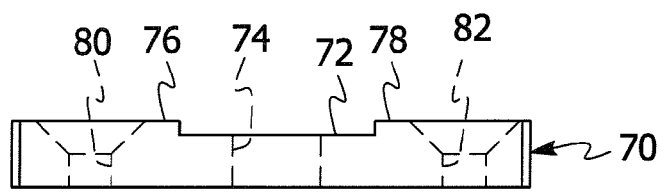
FIG. 5 is a side view of the riser of FIG. 4.
Figure 6:
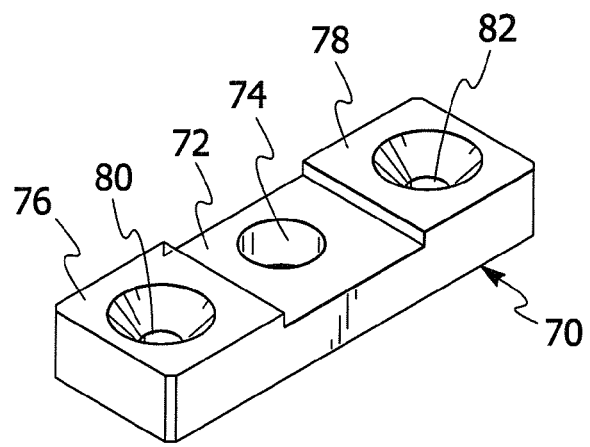
FIG. 6 is a top perspective view of the riser of FIG. 3 and FIG. 4.

FIGS. 4, 5 and 6 show top, side and perspective views of a second embodiment of a riser 70 having a central section 72 having a through bore 74, the central section 72 being located between side rails 76 and 78. The side rails 76 and 78 each have a through bore 80 and 82 respectively. The through bores 80 and 82 each preferably have a countersunk conical hole.

Figure 7:
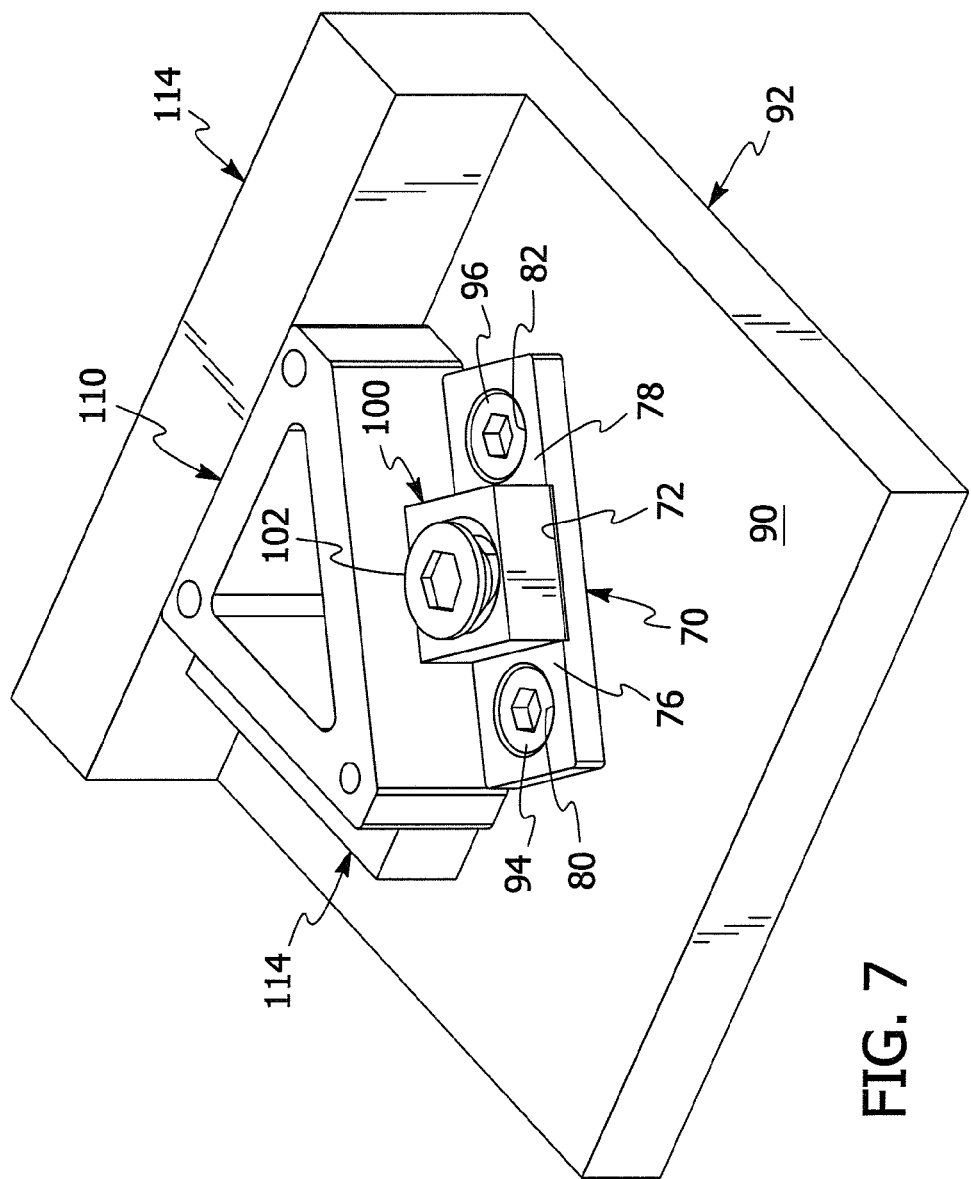
FIG. 7 is a perspective view of a gripping member mounted on the riser of FIGS. 4, 5 and 6.

FIG. 7 shows the riser 70 mounted on the support surface 90 of a fixture 92. Threaded flathead bolts or screws 94 and 96 extend through bores 80 and 82 respectively, to retain the riser 70 in place on the fixture 92. A gripping device 100 is seated in the central section 72 and is held in place by screw 102 which extends through the gripping device 100 and through bore 74 of riser 70 and into the support surface 90 of fixture 92. The workpiece 110 is held by two blocks 112 and 114 and the gripping device 100. The rails 76 and 78 in the riser 70 provide a central predetermined position and angle for replacing the gripping device 100 in the precise location to facilitate gripping the next workpiece to be machined or welded.

Figure 8:
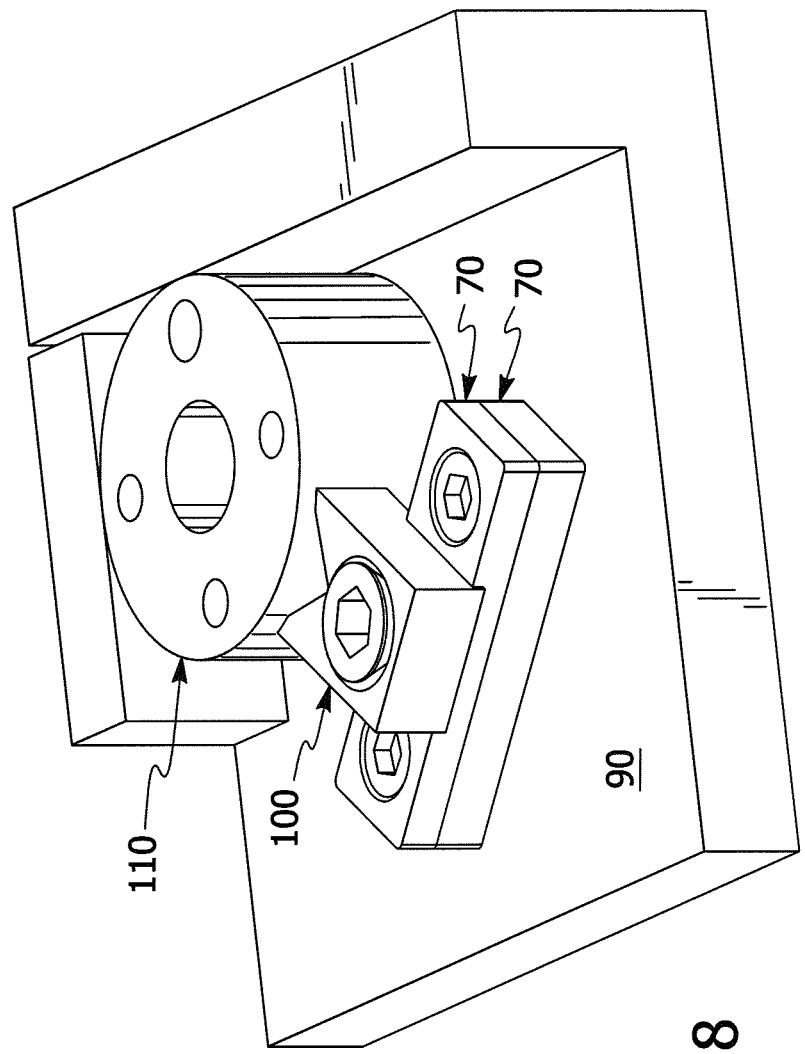
FIG. 8 is a top perspective view of a gripping member mounted on stacked risers.

FIG. 8 shows how a pair of risers 70 can be stacked to elevate the gripping device 100. In practice, several risers 70 may be stacked to raise the gripping device 100 to a height above the support surface 90 as needed to optimally retain the workpiece 110. When stacked risers 70 are used, the through bore 74 may be threaded to receive the screw 102.

While the invention has been described with reference to a preferred embodiment thereof, it is to be understood that modifications or variations may be easily made without departing from the scope of the present invention which is defined by the appended claims.

The invention claimed is:

1. A riser for adjusting the height of a gripping member used in holding a workpiece on a fixture, comprising:
    a) a block portion formed of rigid material having at least a first through bore and a second through bore;
    b) the block portion forming a raised support to raise the height of a gripping member above the surface of the fixture;
    c) the block portion having a pair of spaced apart raised rails wherein the space between said rails is sufficient to allow a gripping member to seat between said rails;
    d) said first through bore having a countersink;
    e) said second through bore is spaced from the first through bore and is elongated in a direction aligned with the first through bore;
    f) wherein, when a gripping member is mounted on said riser, the gripping member is spaced above the fixture to enhance engagement of the gripping member to a workpiece.

2. A riser as set forth in claim 1, wherein;
    a) said countersink in said first through bore provides a conical bore in a top surface of said block portion so that when a fastener having a head is inserted in said first through bore to secure said block portion to a fixture, the head of the fastener is flush with or below the top surface of said block portion.

3. The riser as set forth in claim 2, wherein when said gripping member is removed from said block portion, said block portion remains secured to the fixture so that a finished workpiece can be removed and a new workpiece can then be clamped in position on the fixture.

4. A riser for adjusting the height of a gripping member used in holding a workpiece on a fixture, comprising:
    a) a block portion formed of rigid material having at least a first through bore and a second through bore;
    b) the block portion forming a raised support to raise the height of a gripping member above the surface of the fixture;
    c) the block portion having a pair of spaced apart raised rails wherein the space between said rails is sufficient to allow a gripping member to seat between said rails;
    d) said first through bore and said second through bore each having a countersink; and
    e) said space between said rails is also between said first through bore and said second through bore; and,
    f) wherein, when a gripping member is mounted on said riser, the gripping member is spaced above the fixture to enhance engagement of the gripping member to a workpiece.

5. A riser as set forth in claim 4, wherein;
    a) said countersink in said first through bore provides a conical bore in a top surface of said block portion so that when a fastener having a head is inserted in said first through bore to secure said block portion to a fixture, the head of the fastener is flush with or below the top surface of said block portion.

6. The riser as set forth in claim 5, wherein when said gripping member is removed from said block portion, said block portion remains secured to the fixture so that a finished workpiece can be removed and a new workpiece can then be clamped in position on the fixture.

7. A plurality of stackable risers for adjusting the height of a gripping member used in holding a workpiece on a fixture, comprising:
    a) a block portion formed of rigid material having at least a first through bore and a second through bore;
    b) the block portion forming a raised support to raise the height of a gripping member above the surface of the fixture;
    c) the block portion having a pair of spaced apart raised rails wherein the space between said rails is sufficient to allow a gripping member to seat between said rails; and,
    d) wherein, said plurality of stackable risers may be used to raise the gripping member to a location wherein the gripping member may clamp a workpiece in place for machining.

* * * * *